: US 11,523,665 B2

(12) United States Patent
Africa et al.

(10) Patent No.: US 11,523,665 B2
(45) Date of Patent: Dec. 13, 2022

(54) MODULAR STORAGE

(71) Applicant: Plano Molding Company, LLC, Plano, IL (US)

(72) Inventors: Thomas Africa, Lebanon, OH (US); Ryan R. Berger, Columbus, OH (US); Raymond R. Harpham, Columbus, OH (US); James H. Lua, Columbus, OH (US); Clark P. McCune, Roanoke, TX (US); Ryan T. Olander, Oswego, IL (US); Emily K. Stokes, Columbus, OH (US); Sean W. Svendsen, Columbus, OH (US); John H. Whalen, Sheridan, IL (US)

(73) Assignee: Plano Molding Company, LLC, Plano, IL (US)

( * ) Notice: Subject to any disclaimer, the term of this patent is extended or adjusted under 35 U.S.C. 154(b) by 556 days.

(21) Appl. No.: 16/026,656

(22) Filed: Jul. 3, 2018

(65) Prior Publication Data

US 2019/0000199 A1    Jan. 3, 2019

Related U.S. Application Data

(60) Provisional application No. 62/528,303, filed on Jul. 3, 2017.

(51) Int. Cl.
| | |
|---|---|
| *A45C 7/00* | (2006.01) |
| *A45C 5/06* | (2006.01) |
| *A45C 11/20* | (2006.01) |
| *A45C 13/02* | (2006.01) |
| *A01K 97/06* | (2006.01) |

(52) U.S. Cl.
CPC .............. *A45C 7/009* (2013.01); *A45C 5/06* (2013.01); *A45C 7/005* (2013.01); *A45C 11/20* (2013.01); *A01K 97/06* (2013.01); *A45C 13/02* (2013.01)

(58) Field of Classification Search
CPC .......... A45C 7/009; A45C 7/005; A45C 5/06; A45C 11/20; A45C 9/00; A45C 13/36
USPC ....................... 220/23.4, 23.2, 23.86, 23.83; 190/107–111
See application file for complete search history.

(56) References Cited

U.S. PATENT DOCUMENTS

| | | | | |
|---|---|---|---|---|
| 4,560,096 A | * | 12/1985 | Lucas | B62B 3/1464 |
| | | | | 220/9.4 |
| 5,518,315 A | * | 5/1996 | Nichols | A45C 3/00 |
| | | | | 383/119 |

(Continued)

FOREIGN PATENT DOCUMENTS

GB     2545692     6/2017

*Primary Examiner* — James N Smalley
*Assistant Examiner* — Jennifer Castriotta
(74) *Attorney, Agent, or Firm* — Husch Blackwell LLP

(57) ABSTRACT

A soft-store having a storage compartment for holding one or more articles. The soft-store has a main body that can be inserted into and seated in a crate. The soft-store has a plurality of walls that form a portion of the storage compartment, a top body that attaches to the main body and covers the storage compartment, and a pair of ancillary bodies. Each of the ancillary bodies has an end portion that rotatably attaches to the main body and an opposite end portion that rotates away from the main body to allow the ancillary bodies to be moved to a single-hand transport configuration. The main body includes an attachment mechanism that attaches the main body to the crate.

19 Claims, 12 Drawing Sheets

(56) References Cited

U.S. PATENT DOCUMENTS

| | | | | |
|---|---|---|---|---|
| 5,833,095 A * | 11/1998 | Russell | ............... | A45F 5/02 |
| | | | | 224/576 |
| 5,873,504 A | 2/1999 | Farmer | | |
| 6,126,003 A * | 10/2000 | Brouard | ............... | A45C 3/00 |
| | | | | 206/372 |
| 6,138,827 A * | 10/2000 | Marshall | ............... | B25H 3/00 |
| | | | | 206/373 |
| 6,390,345 B1 * | 5/2002 | Brown | ............... | A45C 3/00 |
| | | | | 190/110 |
| 6,619,447 B1 * | 9/2003 | Garcia, III | ............... | A45C 7/0086 |
| | | | | 150/111 |
| 9,283,669 B2 * | 3/2016 | Hassler | ............... | B65D 33/06 |
| 2002/0015538 A1 * | 2/2002 | Snider | ............... | A45C 13/02 |
| | | | | 383/18 |
| 2003/0000612 A1 | 1/2003 | Sutton | | |
| 2004/0208397 A1 | 10/2004 | Yi | | |
| 2006/0180624 A1 * | 8/2006 | Sadow | ............... | A45C 7/009 |
| | | | | 224/582 |
| 2008/0011567 A1 * | 1/2008 | Hammond | ............... | A45C 7/009 |
| | | | | 190/108 |
| 2010/0294403 A1 * | 11/2010 | Gyuran | ............... | A45C 7/009 |
| | | | | 150/104 |
| 2010/0307879 A1 | 12/2010 | Saetia | | |

\* cited by examiner

MODULAR STORAGE

CROSS REFERENCE TO PRIOR APPLICATION

This application claims priority to and the benefit thereof from U.S. Provisional Patent Application No. 62/528,303, filed Jul. 3, 2017, titled "Modular Storage," the entirety of which hereby incorporated herein by reference.

FIELD OF THE DISCLOSURE

The disclosure relates generally to an article storage and organizer, and, more particularly, a soft crate article storage and organizer.

BACKGROUND OF THE DISCLOSURE

Campers and fishermen frequently use crates to store and transport desired gear and equipment. These crates can include milk crates. While providing a mechanism for storing and transporting gear and equipment, these crates do not provide any organizational or compartmentalized features. Moreover, the openings in the crates can result in gear falling out and be lost, or worse, accidentally stepped on in the case of fishing hooks, and the like.

An unfulfilled need exists for a practical, efficient, and easy to use modular storage system that provides organization and/or compartmentalized features, and that securely holds articles.

SUMMARY OF THE DISCLOSURE

The instant disclosure provides a modular storage that satisfies the aforenoted unmet needs. The disclosure provides a modular storage system that includes a soft-store to complement storage options many users, such as, for example, kayak fishermen, can benefit from. The soft-store can be designed and shaped to fit inside a crate or rest on a surface such as, for example, the deck of a vessel such as a kayak.

According to an embodiment of the disclosure, a soft-store is provided that has a storage compartment for holding one or more articles. The soft-store comprises a main body having a plurality of walls that form a portion of the storage compartment; a top body that attaches to the main body and covers the storage compartment; and a pair of ancillary bodies, each having an end portion that rotatably attaches to the main body and an opposite end portion that rotates away from the main body to allow the ancillary bodies to be moved to a single-hand transport configuration, wherein the main body includes an attachment mechanism that attaches the main body to the crate.

The attachment mechanism can comprise four fasteners, including two fasteners attached to a first wall of the main body and two fasteners attached to a second, opposite wall of the main body.

The attachment mechanism can comprise a crate fastener that passes through an opening in the crate and attaches to a fastener on the top body to secure the main body to the crate.

The attachment mechanism can comprise a fastening member that passes through an opening in the crate and attaches to a fastener on a carrying strap, wherein the fastening member secures the main body to the crate.

The attachment mechanism can comprise a pair of fastening members that attach to a fastener, and a crate strap that attaches to at least one of said pair of fastening member.

One of the pair of fastening members can pass through an opening in the crate and attach to a fastener on a carrying strap to secure a portion of the crate between the pair of fastening members.

According to a further aspect of the disclosure, a modular storage system is provided that has a storage compartment for holding one or more articles. The modular storage system comprises a crate and the soft-store, discussed above. The soft-store comprises a main body that can be inserted into and removably affixed to the crate or other similar device. The soft-store can be configured to insert into a standard size and type crate, or used freestanding.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it can be practiced.

Figure 1:
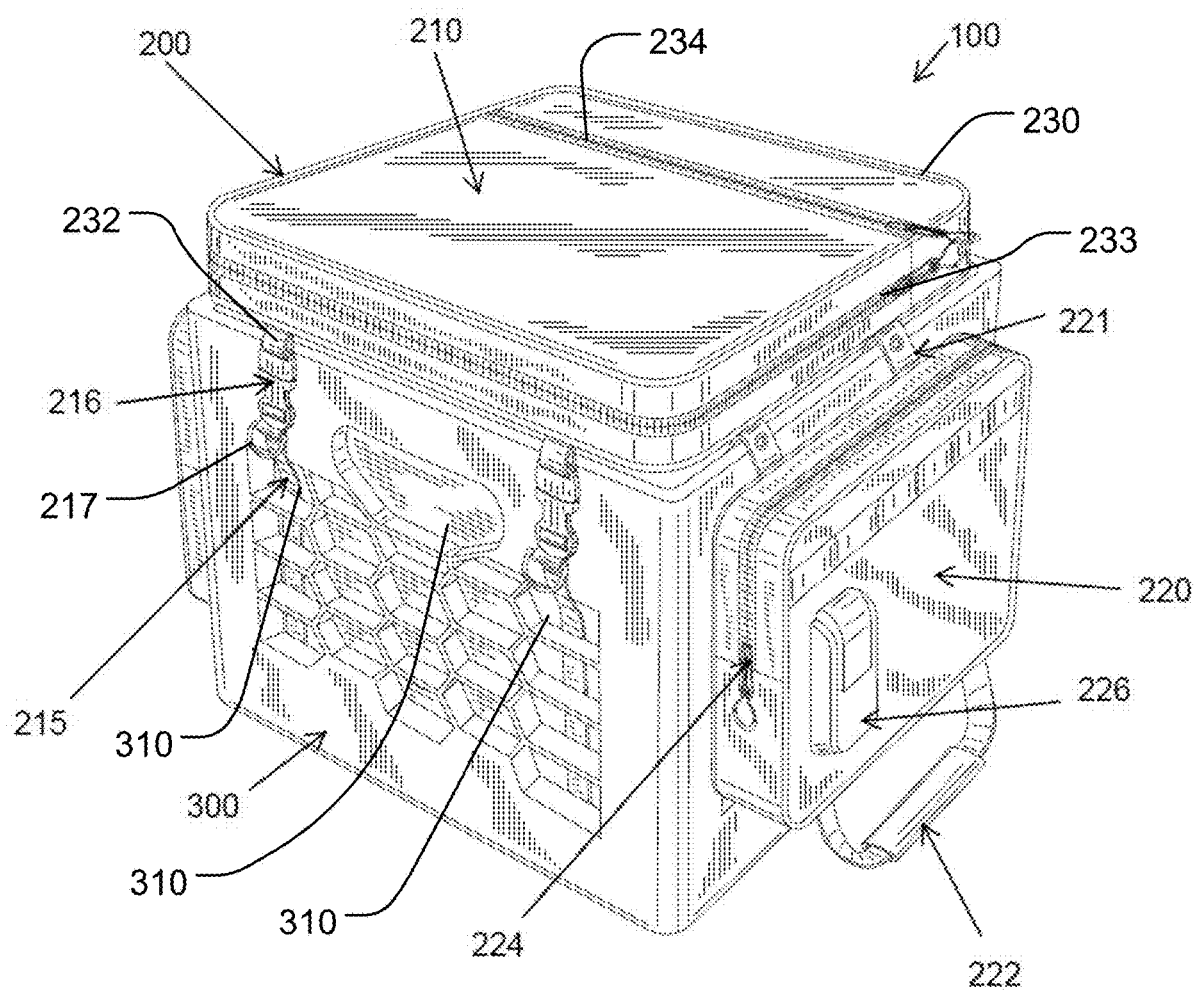
FIG. 1 shows a first perspective view of an example of a modular storage system constructed according to the principles of the disclosure.

The present disclosure is further described in the detailed description and drawings that follow.

DETAILED DESCRIPTION OF THE DISCLOSURE

The embodiments of the disclosure and the various features and advantageous details thereof are explained more fully with reference to the non-limiting embodiments and examples that are described and/or illustrated in the accompanying drawings and detailed in the following description.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

Figure 2:
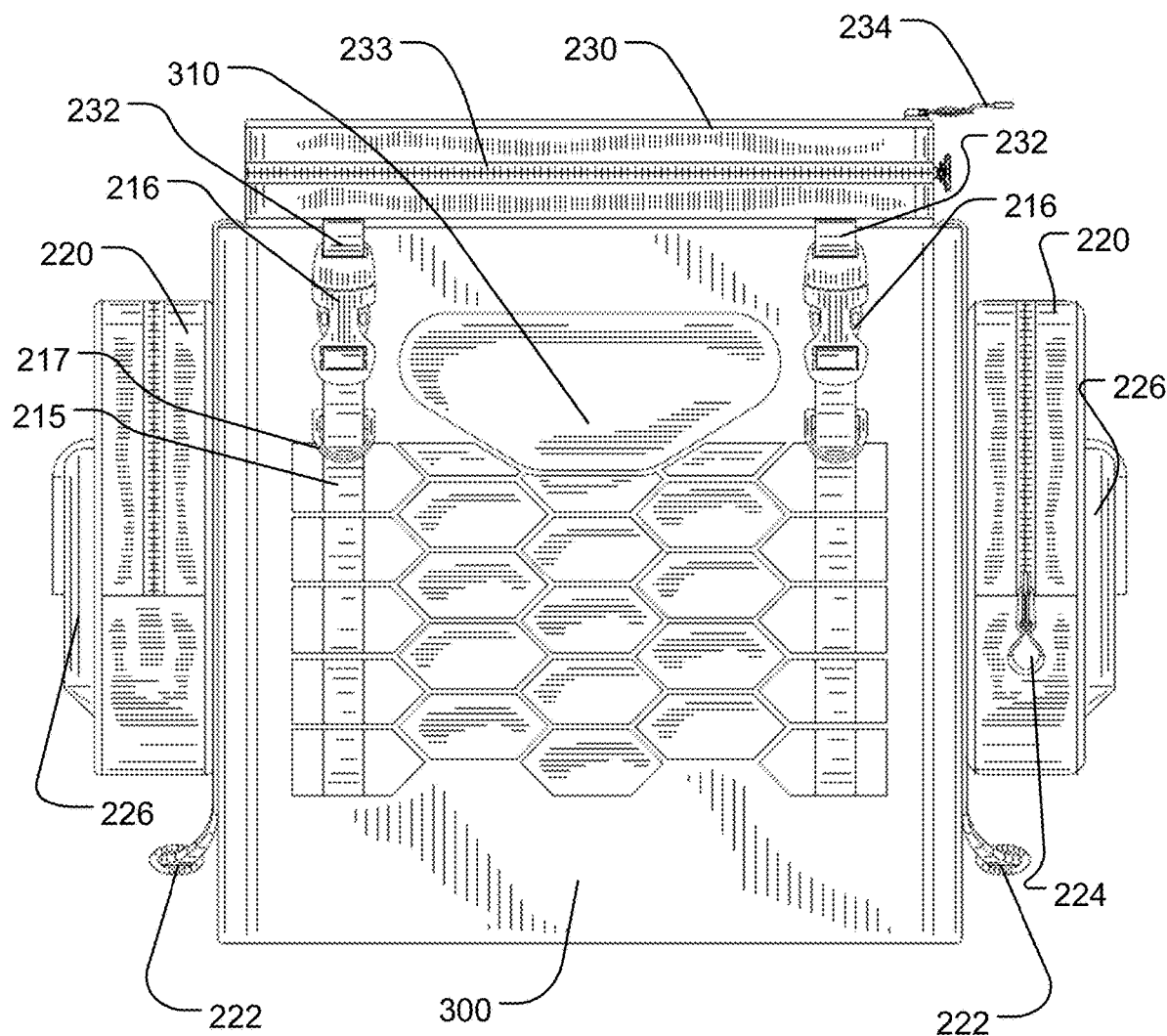
FIG. 2 shows a second (e.g., front and/or rear) view of the modular storage system shown in FIG. 1.
Figure 3:
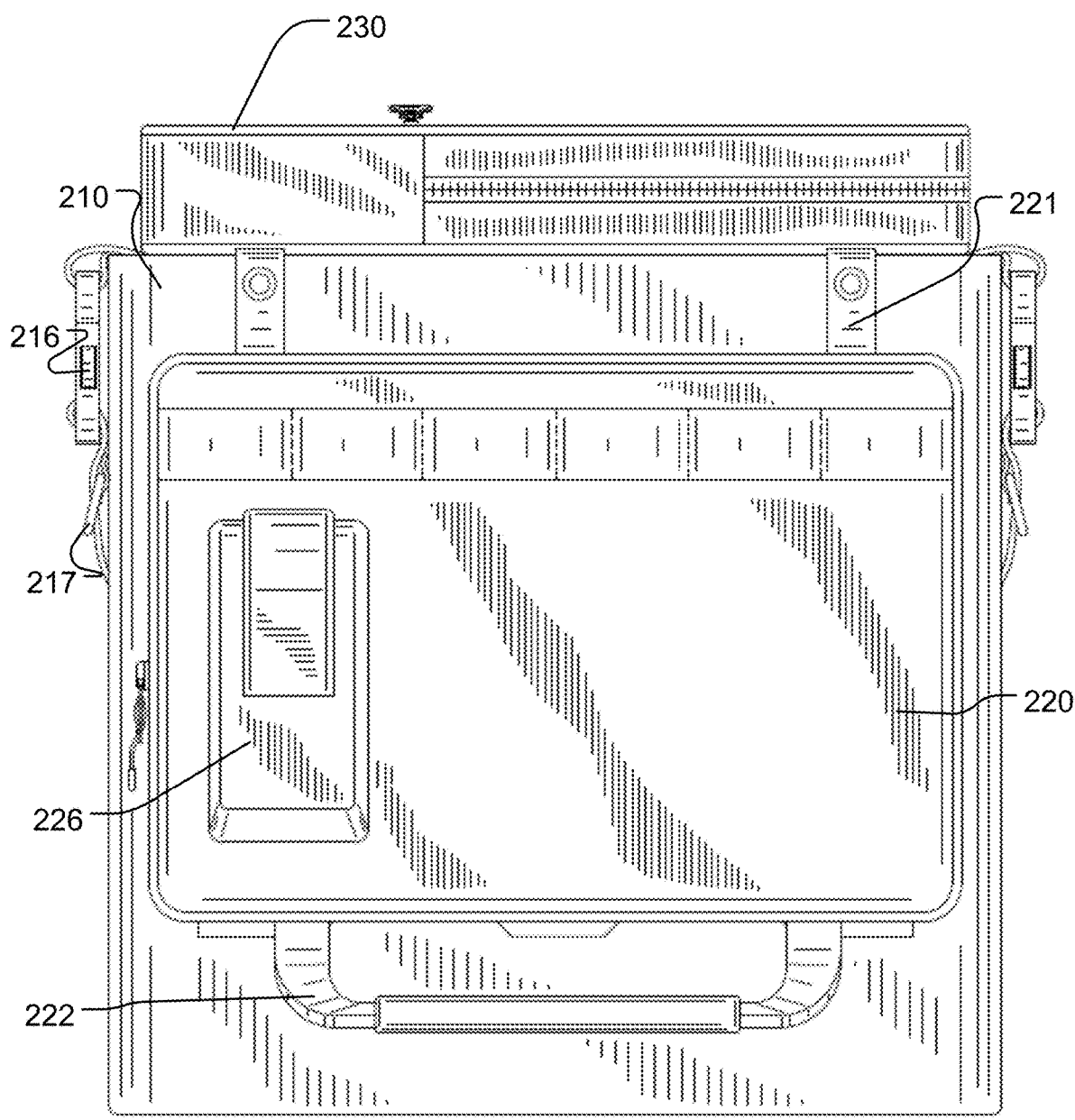
FIG. 3 shows a third (e.g., side) view of the modular storage system shown in FIG. 1.
Figure 4:
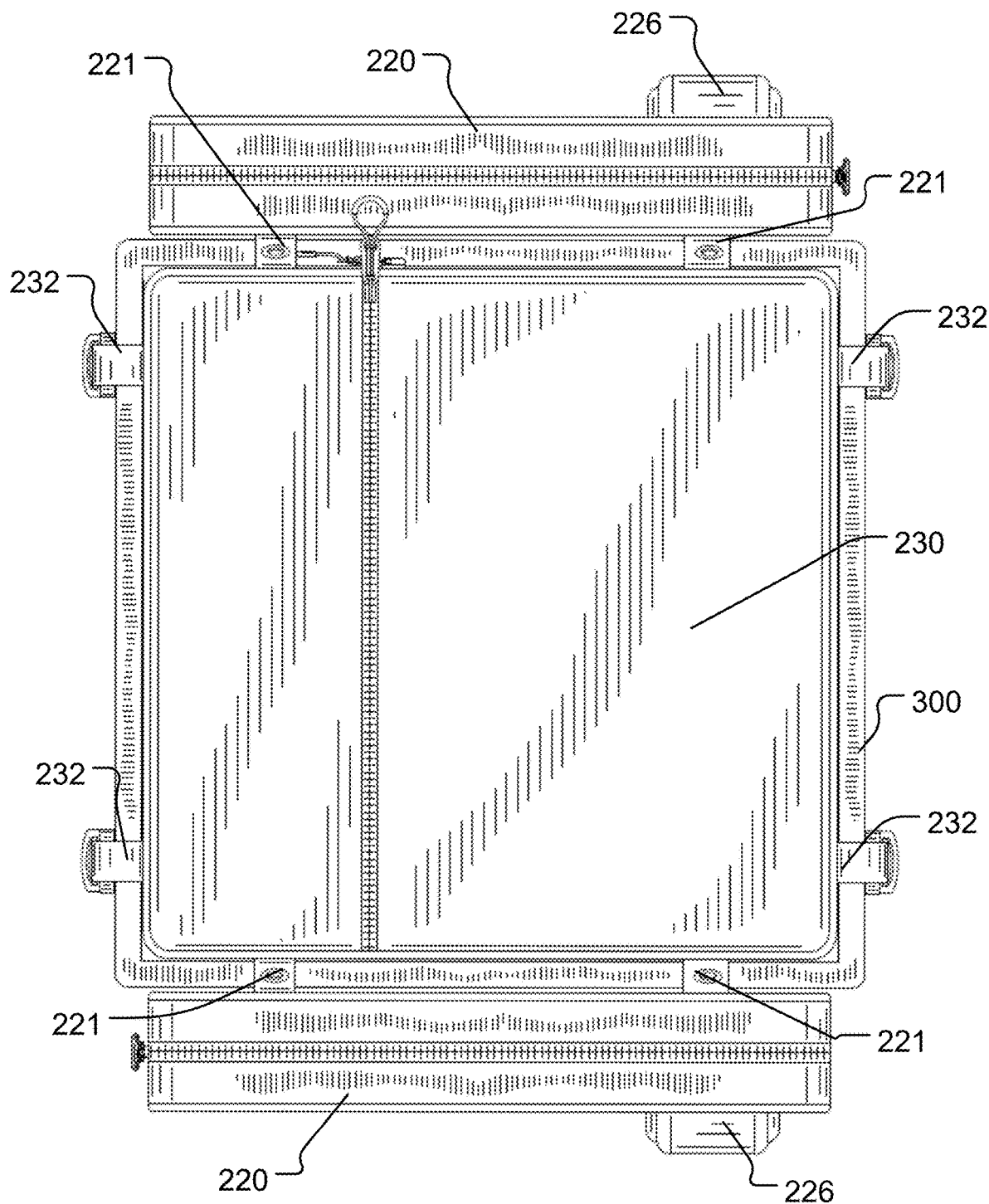
FIG. 4 shows a fourth (e.g., top) view of the modular storage system shown in FIG. 1.
Figure 5:
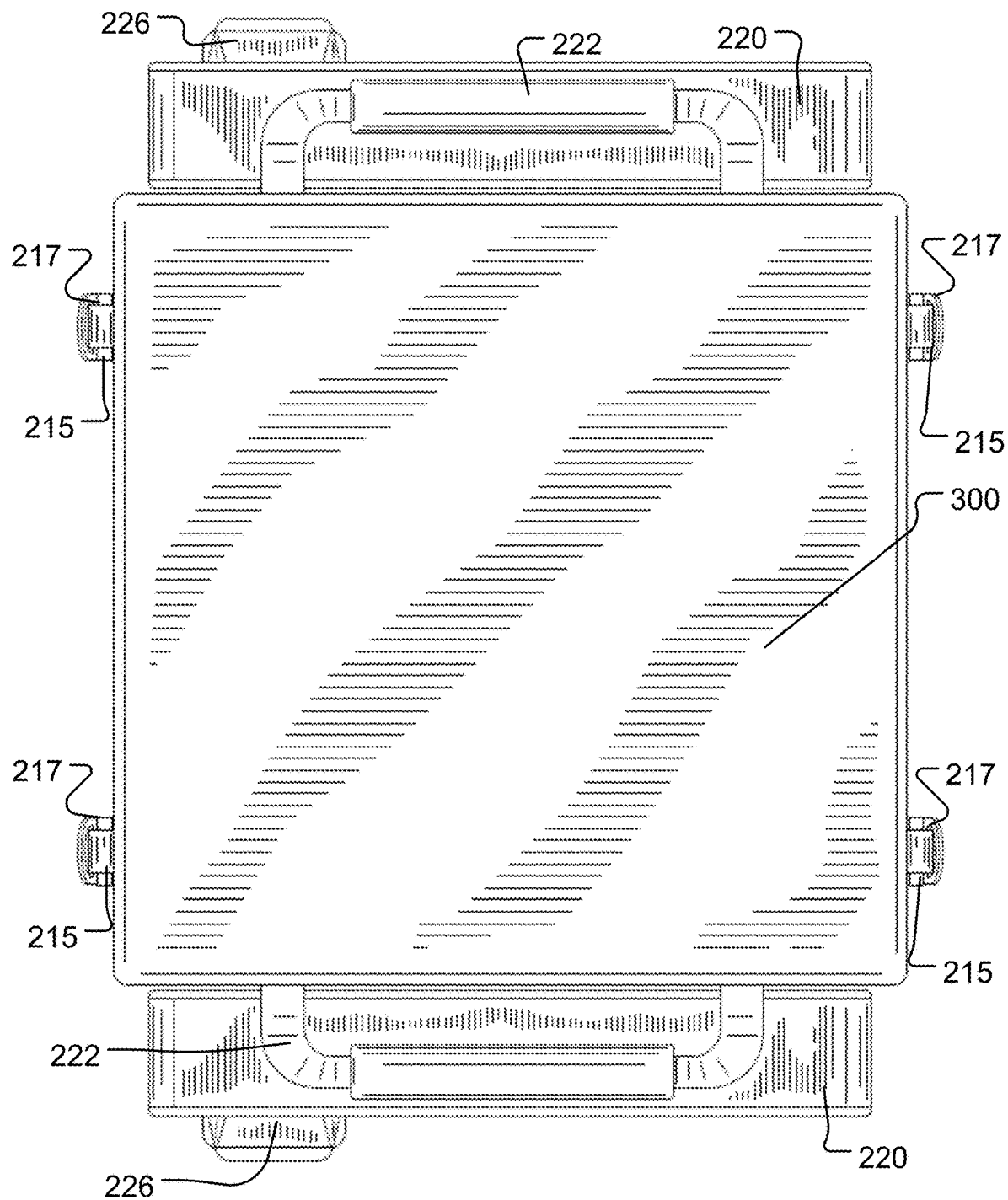
FIG. 5 shows a fifth (e.g., bottom) view of the modular storage system shown in FIG. 1.
Figure 6:
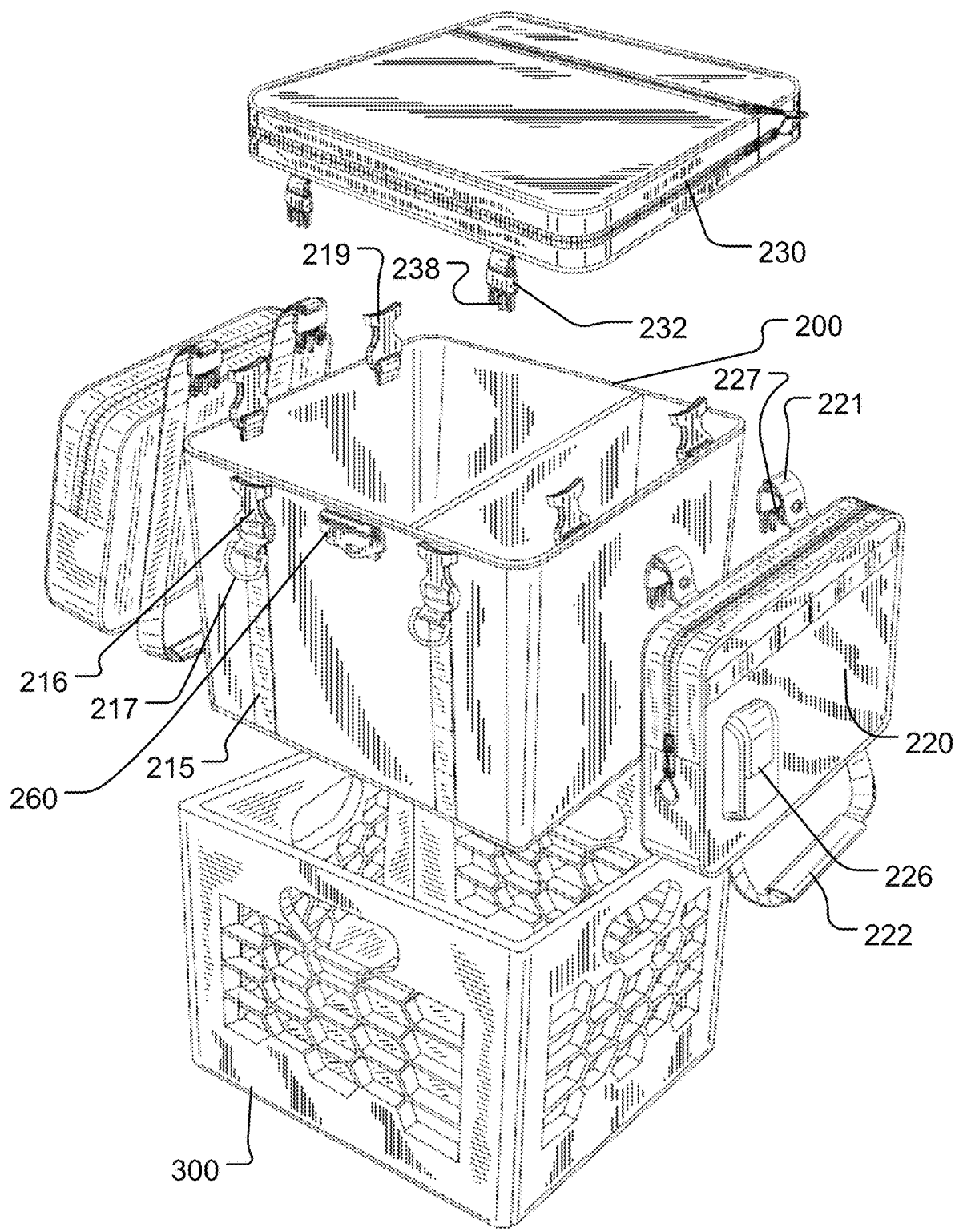
FIG. 6 shows a sixth, exploded perspective view of the modular storage system shown in FIG. 1.
Figure 12:
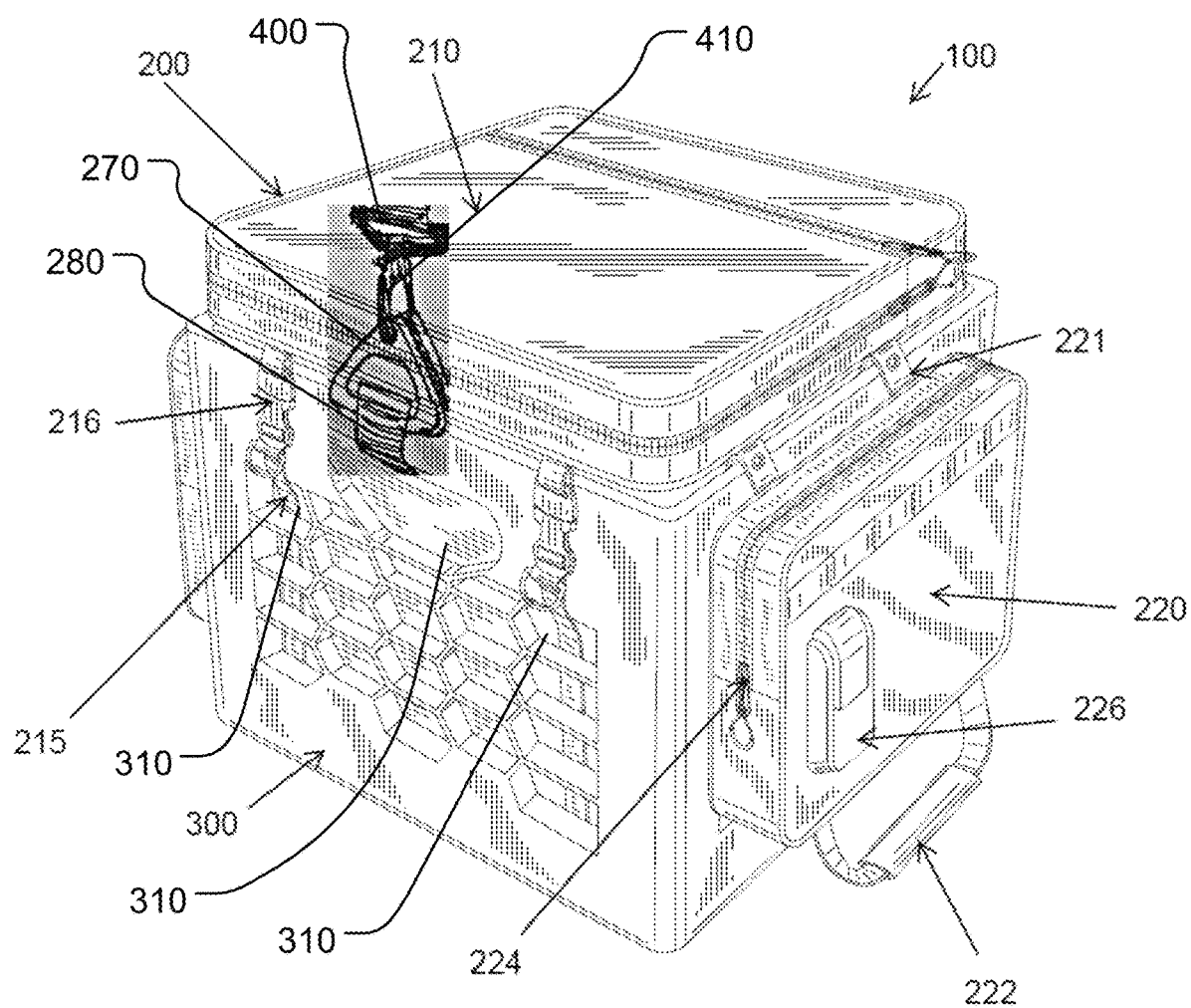
FIG. 12 shows another example of a modular storage system, including the soft-store shown in FIG. 11.

FIGS. 1-6 and 12 show various views of a modular storage system 100 that is constructed according to the principles of the disclosure. More specifically, FIG. 1 shows a first perspective view the modular storage system 100; FIG. 2 shows a second (e.g., front and/or rear) view of the modular storage system 100; FIG. 3 shows a third (e.g., side) view of the modular storage system 100; FIG. 4 shows a fourth (e.g., top) view of the modular storage system 100; FIG. 5 shows a fifth (e.g., bottom) view of the modular storage system 100; FIG. 6 shows a sixth, exploded perspective view of the modular storage system 100; and FIG. 12 shows the modular storage system 100 with a carrying strap 400 attached to a fastening member 270.

Figure 7:
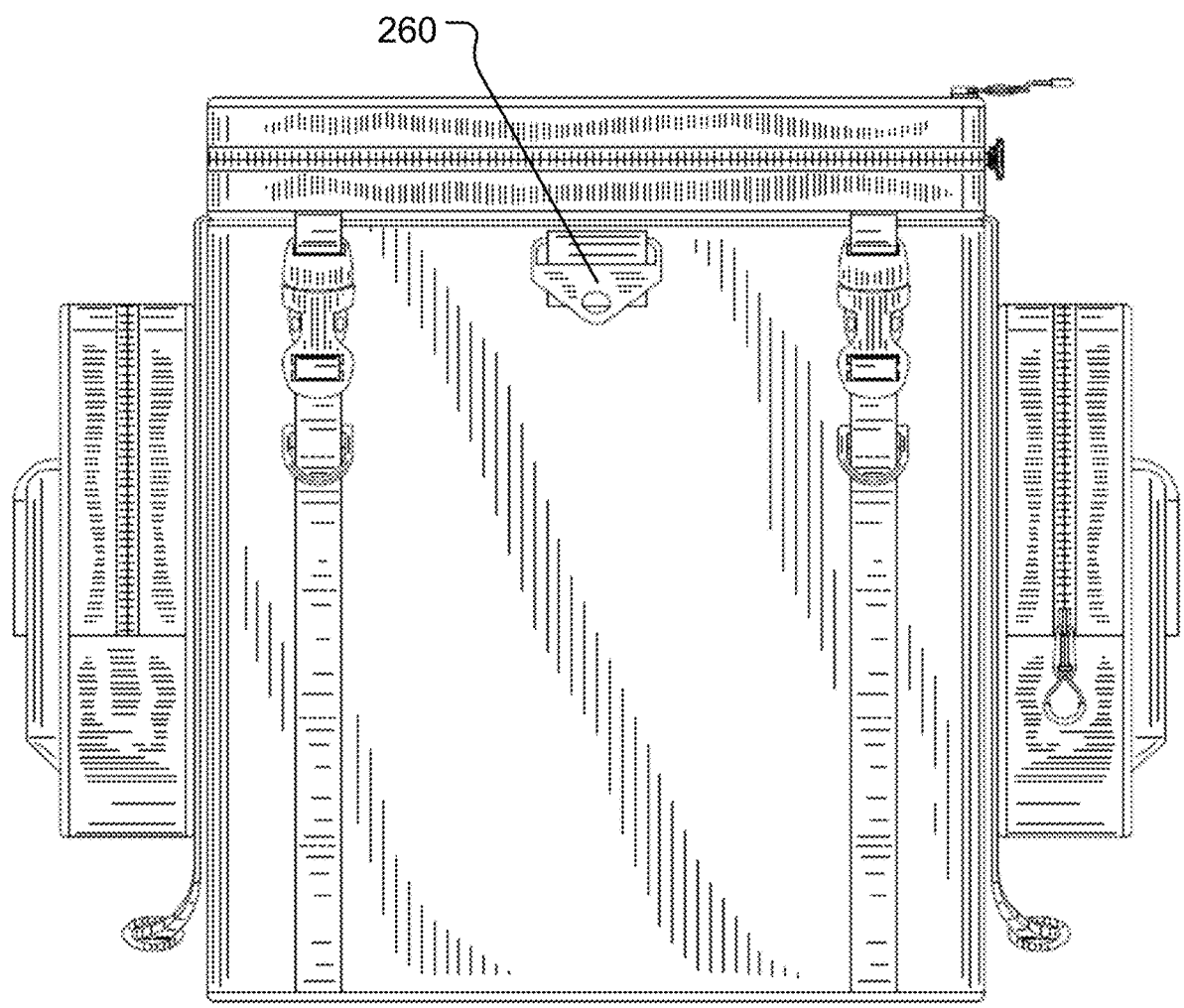
FIG. 7 shows a first (e.g., front and/or) view of an example of a soft-store that is constructed according to the principles of the disclosure and that can be included in the modular storage system shown in FIG. 1.
Figure 8:
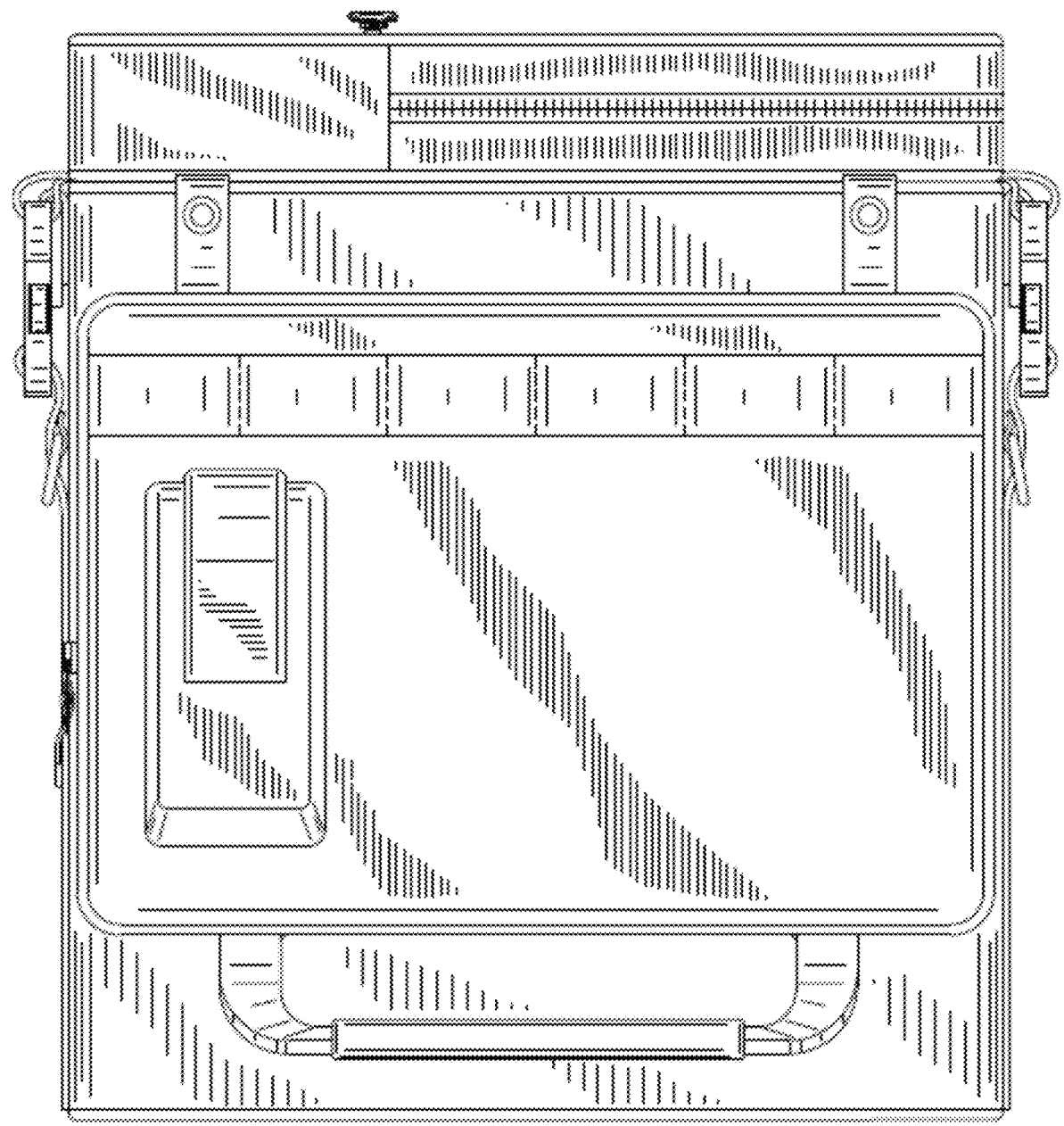
FIG. 8 shows a second (e.g., side) view of the soft-store shown in FIG. 7.
Figure 9:
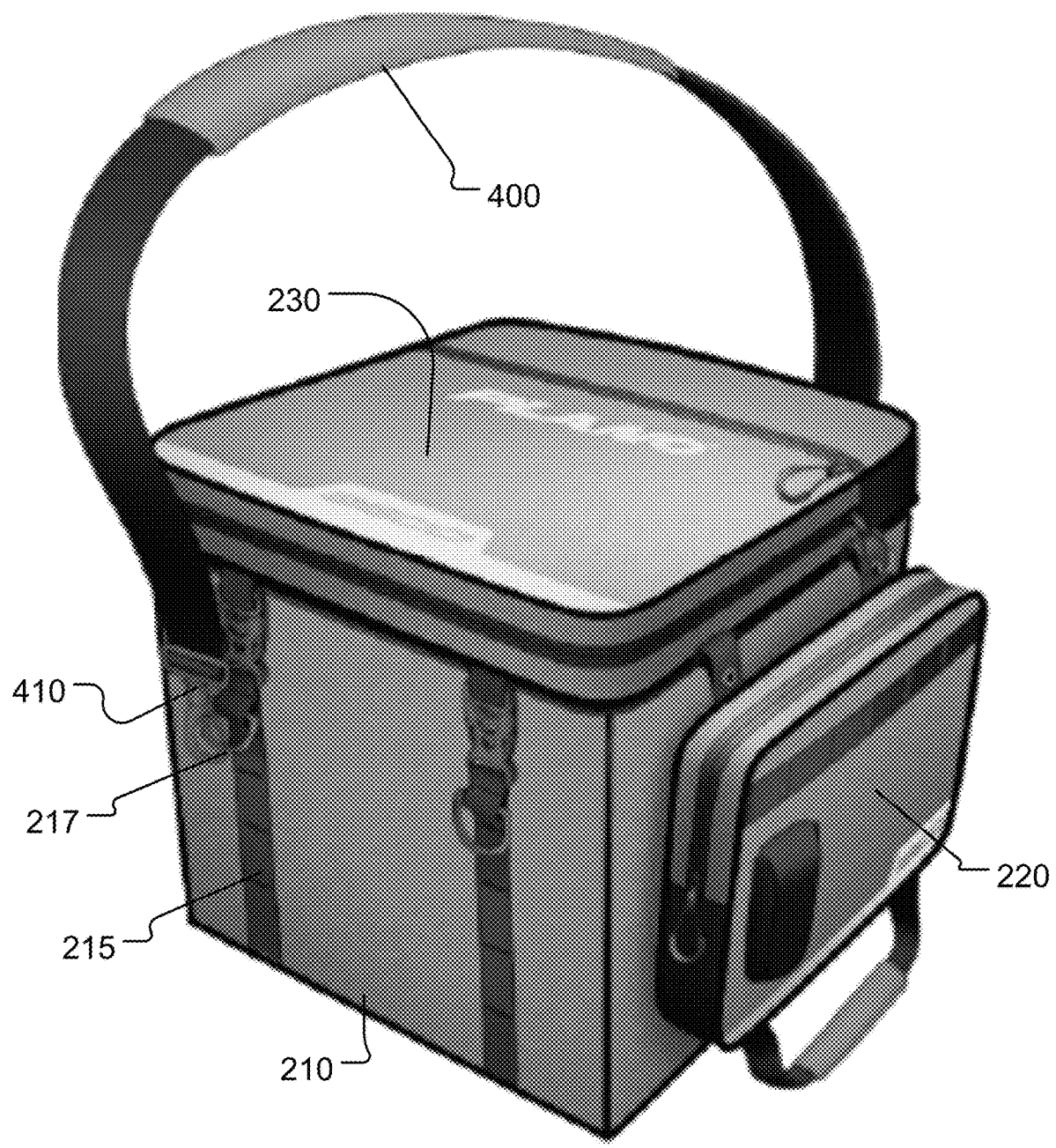
FIG. 9 shows a perspective view of another example of a soft-store that is constructed according to the principles of the disclosure and that can be included in the modular storage system shown in FIG. 1.
Figure 10:
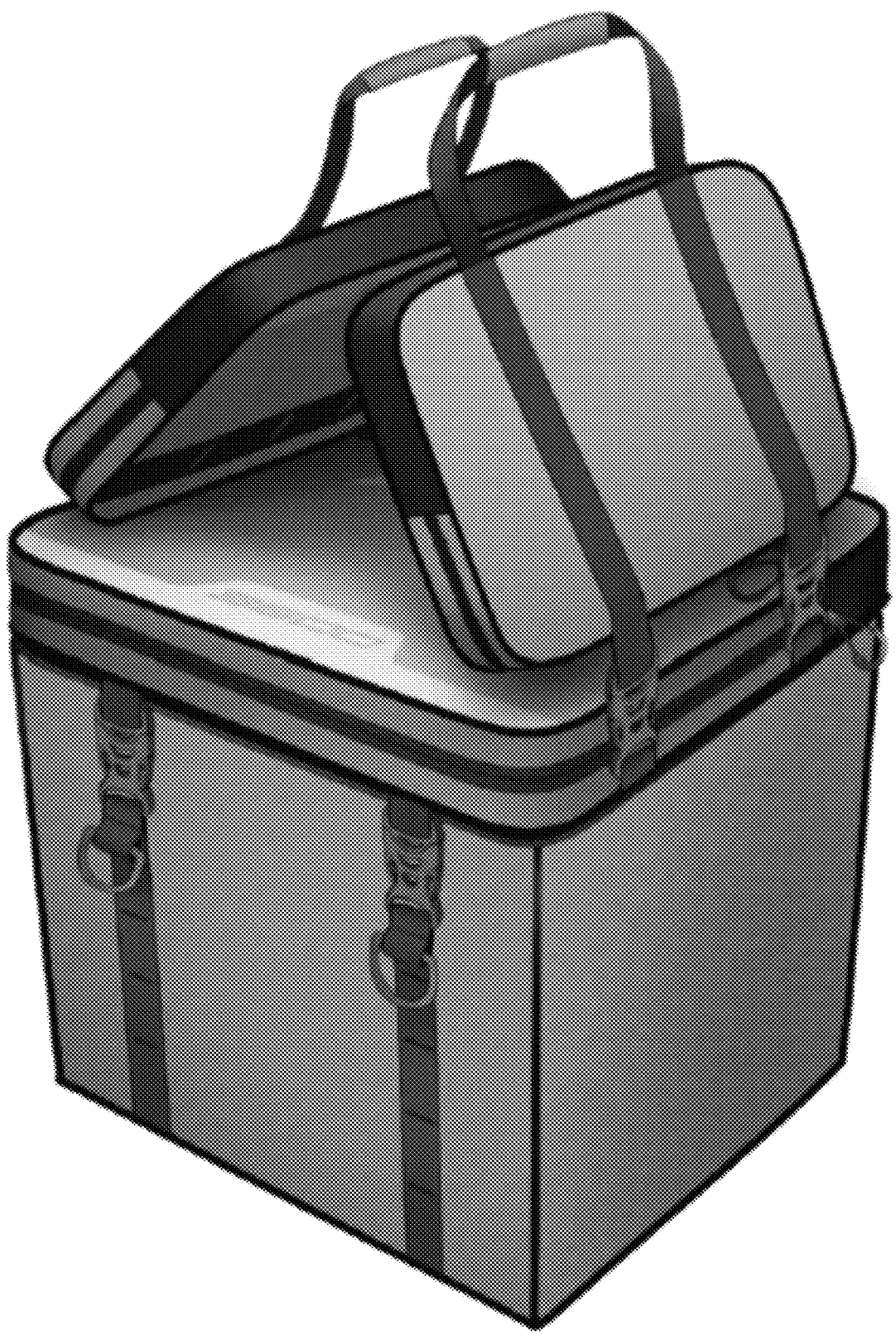
FIG. 10 shows a perspective view of the soft-store shown in FIG. 9 with a pair of ancillary bodies configured in a transport configuration.
Figure 11:
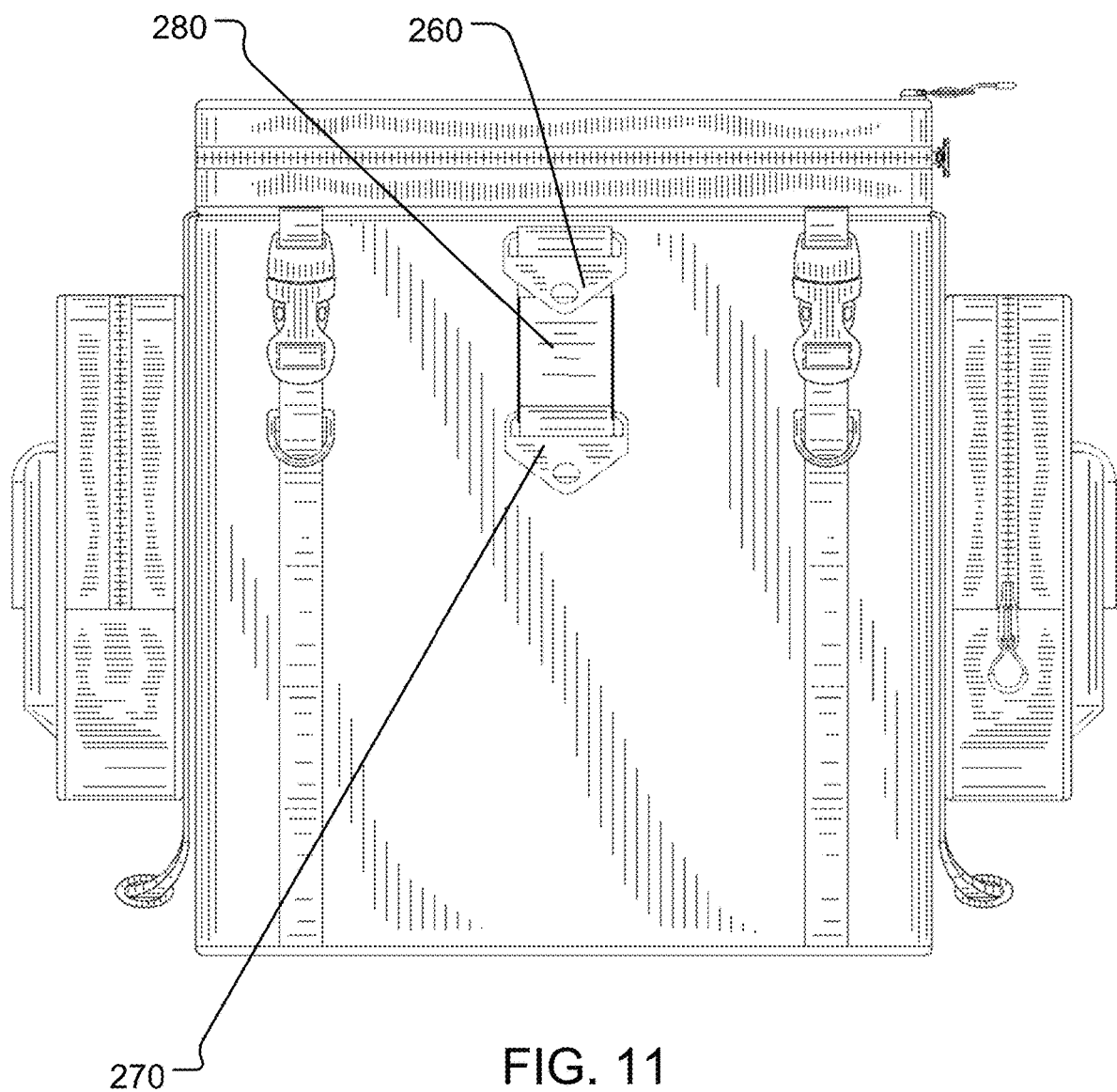
FIG. 11 shows another example of a soft-store that is constructed according to the principles of the disclosure and that can be included in the modular storage system shown in FIG. 1.

FIGS. 7-11 show various views of an example of a soft-store 200 that can be inserted in a crate 300 in the modular storage system 100. More specifically, FIG. 7 shows a first (e.g., front and/or) view of the soft-store 200 (without the crate 300); FIG. 8 shows a second (e.g., side) view of the soft-store 200; FIG. 9 shows a perspective view of the soft-store 200 provided with a carrying strap 400; FIG. 10 shows a perspective view of the soft-store 200 with a pair of ancillary bodies 220 configured in a one-hand transport configuration; and FIG. 11 shows the soft-store 200 with a pair of fastening members 260, 270 and a crate strap 280.

Referring to FIGS. 1-6 and 12, the modular storage system 100 comprises a soft-store 200. The modular storage system 100 can further include a crate 300. The crate 300 can include a conventional beverage crate, milk crate, or any other type of crate or container that can serve the purposes contemplated herein. The crate 300 can include one or more openings 310. The openings 310 can be located on one or more sides of the crate 300, including on each of at least two opposing sides of the crate 300.

The soft-store 200 includes a main body 210. The soft-store 200 can include at least one ancillary body 220. The soft-store 200 can include a top body 230. The main body 210, ancillary body 220, and/or top body 230 can be made of a soft or hard material and can be constructed to include internal walls having soft or hard structures, depending on the intended application. The walls of each of the main body 210, ancillary body 220, and/or top body 230 can include an insulating material so as to maintain the inner chamber(s) therein at a desired temperature or temperature range for extended periods of time. The main body 210 and the ancillary body 220 and/or top body 230 can be formed as multiple pieces that can be attached to each other, as seen in FIG. 6.

The main body 210 is configured to be inserted into the crate 300, as seen in FIGS. 1-6 and 12. The main body 210 can include one or more chambers (or compartments), such as, for example, the two chambers shown in FIG. 6. The main body 210 can include a removable liner that can be inserted in the main body 210. The liner (not shown) can be secured to inner walls of the main body 210 by means of a fastener. The main body 210 can be configured so that an opening at the top portion of the main body 210 can be accessible while the main body 210 is inserted in the crate 300, thereby providing accesses to one or more chambers formed in the main body 210. The main body 210 can be secured to the crate 300, as discussed below.

The top of the main body 210 can be fully (or partially) covered by the top body 230, so as to enclose (or open) the one or more chambers within the soft-store 200. The top body 230 can be opened or closed while the main body 210 is inserted in (and, optionally, attached to) the crate 300. The main body 210 can include one or more crate fasteners. Each crate fastener can include a strap 215 and a fastener 216. The crate fastener can include a loop 217. The loop 217 can include, for example, a D-ring, an O-ring, a hoop, a grommet, and the like. In a non-limiting embodiment of the soft-store 200, the crate fasteners include four crate fasteners, including two crate fasteners provided on one side of the soft-store 200 (and, more specifically, the main body 210), and two additional crate fasteners provided on an opposing side of the soft-store 200 (and, more specifically, the main body 210). Each fastener 216 can include a lock mechanism. Each crate fastener can have one end attached to a wall or the floor of the main body 210, and the other end attached to the wall of the main body 210.

The fastener 216 can be attached to or integrally formed with an end portion of the strap 215. The strap 215 can be formed as a single strap that attaches to a portion of each of a pair of opposite side walls and the entire length (or width) of the bottom of the main body 210, so as to substantially wrap around the opposing side walls and bottom to provide added strength for carrying heavier articles, such as when the soft-store 200 is used without the crate 300. Alternatively, the strap 215 can be attached to only a portion of the side wall of the main body 210.

The loop 217 can be attached to or integrally formed with the end portion of the strap 215 of the crate fastener. The loop 217 can be configured to engage with a fastener, such as, for example, a fastener 410, as seen in FIG. 9. The fastener 216 and the loop 217 can be attached to or integrally formed with one or both end portions of the strap 215, such as in the embodiment where the strap 215 wraps around the pair of opposing side walls and bottom of the main body 210. The end portion of the crate fastener can be of sufficient length to permit a portion of the strap 215, fastener 216 and loop 217 to pass through an opening 310 in the crate 300 and be accessible from outside of the crate 300, as seen in FIG. 1. The fastener 216 can be attachable to a corresponding fastener 232 on the top body 230, as seen in FIGS. 1-6, thereby allowing for attachment and securing the top body 230 to the main body 210, and, optionally, to the crate 300.

According to a non-limiting embodiment, the main body 210 can include, for example, four crate fasteners, including a pair of crate fasteners on each of two opposite sides of the main body 210 (as seen in FIG. 4), so as to securely attach the main body 210 to the top body 230 and/or crate 300.

The top body 230 can include one or more compartments (not shown) that can be accessible via respective one or more opening, each of which can be sealable by a fastener, such as, for example, a fastener 233 and/or a fastener 234. The body 230 can be configured to provide a water-proof seal to prevent water (e.g., rain) from getting into the main body 210. The top body 230 can include one or more main body fasteners 232, each of which can be configured to attach to a corresponding fastener 216 on the main body 210 to secure the top body 230 to the main body 210 and, optionally, the crate 300 via the opening 310. The main body fastener 232 can include a male portion 238 that can be coupled to a corresponding female portion in the fastener 216 of the crate fastener, as seen in FIG. 6.

FIGS. 7-11 show various views of the soft-store 200 without the crate 300. The ancillary body 220 can be constructed of the same material as the main body 210. The ancillary body 220 can include one or more compartments or chambers (not shown) that can be accessible via an opening that can be opened or closed by means of a closure mechanism 224. The ancillary body 220 can include one or more attachment mechanisms 221. The attachment mechanism 221 can be attachable/detachable to the main body 210. The attachment mechanism 221 can include, for example, a strap and a fastener that allows for quick attachment/detachment of the ancillary body 220. The attachment mechanism 221 can include a main body fastener 227 (shown in FIG. 6) that attaches to a corresponding fastener 219 (shown in FIG. 6) on the main body 210.

When attached to the main body 210, the ancillary body 220 is configured to allow an end portion of the ancillary body 220 to pivot away from the main body 210 and rotatably lift more than 180° with respect to the main body 210 (as seen in FIG. 10), so as to provide for a one-hand transport (or carrying) configuration, as seen in FIG. 10.

According to a non-limiting embodiment, the soft-store 200 includes a pair of ancillary bodies 220 positioned on opposite sides of the main body 210, as seen in FIG. 10. Each ancillary body 220 can include a handle 222 that can be easily gripped by a user's hand and manipulated to pivot and lift each ancillary body 220 (as seen in FIG. 10) to withdraw the soft-store 200 from the crate 300 by pulling on the handles 222 and/or to carry the soft-store 200 using a single hand. The main body 210 can be similarly lowered into the crate 300 by holding on to the handles 222 and lowering the main body 210 into the crate 300.

The ancillary body 220 can include one or more side compartments 226, which can hold articles such as, for example, cellular telephone devices, car keys, wallet, and the like.

Referring to FIGS. 6, 7, 11 and 12, the soft-store 200 can include one or more single fastening members 260 provided on the main body 210 (shown in FIGS. 6 and 7) and/or one or more multi-fastening members 260/270 with strap(s) 280 (shown in FIGS. 11 and 12). The fastening members 260 and/or 270 can include a D-ring, an O-ring, a loop, a hoop, a grommet, and the like. Preferably, the fastening member 260 and/or multi-fastening members 260/270 should be provided in pairs, each of which should be attached to an opposite wall of the main body 210, so as to provide counter-balancing during use. In the case of the multi-fastening members 260, 270 (shown in FIGS. 11 and 12), the strap 280 should be made of sufficient length to allow the fastening member 270 to pass (together with a portion of the crate strap 280) through the opening 310 in the crate 300 and be positionable above or proximate to the edge of the crate 300 and proximate to the fastening member 260 (shown in FIG. 12), so that both fastening members 260 and 270 can be simultaneously fastened to a fastener 410 and carrying strap 400, thereby simultaneously securing the soft-store 200 to the crate 300. Thus, the fastening members 260/270 can be configured to receive and transfer a portion (or all) of the force from the fastener 410 and carrying strap 400 to the crate 300, when the modular storage system 100 is carried by the strap 400.

Referring to FIGS. 10-12, a user can grasp and lift both handles 222 of the ancillary bodies 220 to lift the soft-store 200 using a single hand (shown in FIG. 10). The bottom of the soft-store 200 can be aligned with the crate 300, and the main body 100 can be inserted into the crate 300. The user can then release the handles 220 and allow the ancillary bodies 220 to drop to the sides of the crate 300 (shown in FIG. 1). The user can secure the main body 100 (and thereby secure the soft-store 200) to the crate 300 by reaching through an opening 310 on each of two opposite sides of the crate 300 and pulling through the opening 310 the fastening member 270 and a portion of the crate strap 280. The user can attach the fastener 410 to the fastening member 270.

In the case where the main body 210 includes multi-fastening members 260, 270, the fastener 410 can attach to both fastening members 260 and 270, with a wall portion of the crate 300 sandwiched therebetween and secured by the crate strap 280. In this regard, the carry member 260 can be configured to engage and pivot under a force of an upper edge portion of the crate 300 when the main body 210 is being inserted into the crate 300, such that a portion of the fastening member 260 is positioned above the edge portion of the crate 300 to allow for easy access and attachment of the fastener 410 to the fastening member 260. It is noted that the fastening member 270 can be used without use of the fastening member 260.

Referring to FIGS. 6 and 12, alternatively, a user can first insert the main body 210 into the crate 300. After the main body 210 is properly seated in the crate 300, the user can thread (or reach through and pull) each of one or more crate fasteners 215/216/217 through an opening 310 in the crate 300. The top body 230 can be aligned and attach to the top of the main body 210. Each of the fasteners 232 on the top body 230 can be attached to the corresponding fastener 216 on the main body 210. The user can secure the soft-store 200 to the crate 300 using the fasteners 232/216 and/or fastening member 260 and/or 270, as discussed above.

The user can attach one or more ancillary bodies 220 to the main body 210. Where one or more ancillary bodies 220 are attached to the main body 210, the top body 230 can be aligned and attach to the top of the main body 210 after all ancillary bodies 220 are attached. The top body 230 can be fastened to the crate 300 using the fasteners 232/216 and/or fastening member 260 and/or 270, as discussed above.

As discussed above, the soft-store 200 has a main body 210 and can include one or more ancillary bodies 220 that can hold one or more articles. The articles can include, for example, a utility box, gear, equipment, and the like. The ancillary bodies 220 can include two or more ancillary bodies 220, each of which can perform an additional function (i.e., in addition to storage). The soft-store 200 can include a top body 230 that can function as a protective lid that secures articles in the main body 210, and the two ancillary bodies 220 can function as sturdy carry handles. The main body 210, ancillary bodies 220 and top body 230 are easily removable with a series of fasteners and straps that allow a user to customize the soft-store 200 to the user's needs.

The soft-store 200 can include one or more additional attachment mechanisms (not shown) such as, for example, loops, hoops, D-rings, O-rings, grommets, and the like, hold tools, gear, equipment, and the like, in easily accessible locations. The soft-store 200 can insert into a crate or be attached to, for example, a chair in a vessel (e.g., a kayak)

or other points in the cockpit of the vessel to allow for easy and convenient access. The soft-store 200 can be constructed of a flexible material and constructed to enable organized storage in a main compartment of numerous storage containers or gear.

The modular storage system 100 has many and various applications. For instance, the modular storage system 100 can provide an ideal option for a fishing novice who is building up his/her gear collection, or for a skilled angler looking for a customizable storage with lots of storage power. The soft-store 200 provides a lightweight design that travels easily and fits securely in a crate 300, or rests freestanding when used without a crate 300.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

The term "fastener," as used in this disclosure, means, for example, a buckle (e.g., a side-release buckle), a hook-and-loop (e.g., VELCRO™), a zipper, a button, a snap-button, a rivet, a pin, a stitching, an adhesive, a staple, a clip, a clamp, a tie-in, a lock, a clinch, a toggle bolt, a nut, a bolt, or any other device or mechanism that can attach a portion of one article to a portion of another article.

Although process steps, method steps, or the like, may be described in a sequential order, such processes or methods may be configured to work in alternate orders. In other words, any sequence or order of steps that may be described does not necessarily indicate a requirement that the steps be performed in that order. The steps of the processes or methods described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A soft-store and crate system, the soft-store having a storage compartment for holding one or more articles, the system comprising:
   a crate having at least one opening on each of at least two opposing sides; and
   a soft-store including:
      a main body having a plurality of walls that form a portion of the storage compartment;
      a top body that attaches to the main body and covers the storage compartment;
      a pair of ancillary bodies, each having an end portion that rotatably attaches to the main body and an opposite end portion that rotates away from the main body to allow the ancillary bodies to be moved to a single-hand transport configuration; and
      an attachment mechanism arranged, when the main body is removably seated in the crate, to pass through the at least one opening in the crate and attach the main body to the crate,
   wherein the pair of ancillary bodies are arranged to be held when lowering the main body into or lifting the main body from a seated position in the crate wherein a substantial portion of the main body is inserted in the crate.

2. The system of claim 1, wherein the attachment mechanism comprises four fasteners, including two fasteners attached to a first wall of the main body and two fasteners attached to a second, opposite wall of the main body.

3. The system of claim 1, wherein the attachment mechanism comprises:
   a crate fastener arranged to pass through the opening in the crate and attach to a fastener on the top body to secure the main body to the crate.

4. The system of claim 1, wherein the attachment mechanism comprises:
   a fastening member arranged to pass through the opening in the crate and attach to a fastener on a carrying strap,
   wherein the fastening member is arranged to secure the main body to the crate.

5. The system of claim 1, wherein the attachment mechanism comprises:
   a pair of fastening members that attach to a fastener; and
   a crate strap that attaches to at least one of said pair of fastening members,
   wherein one of the pair of fastening members is arranged to pass through the opening in the crate and attach to a fastener on a carrying strap to secure a portion of the crate between the pair of fastening members.

6. A soft-store and crate system, the soft-store having a storage compartment for holding one or more articles, the system comprising:
   a crate having at least one opening on each of at least two opposing sides; and
   a soft-store including:
      a main body having a plurality of walls that form a portion of the storage compartment;
      an attachment mechanism arranged, when the main body is removably seated in the crate, to pass through the at least one opening in the crate and attach a portion of the main body to the crate, and
      a top body having a fastener that attaches to the attachment mechanism to secure the top body to the main body;
   wherein the main body is arranged to be insertable in the crate such that the storage compartment is accessible while the main body is seated in the crate, and
   wherein the main body is arranged such that a substantial portion of the main body is inserted in the crate when the main body is seated in the crate.

7. The system of claim 6, wherein the attachment mechanism comprises four fasteners, including two fasteners attached to a first wall of the main body and two fasteners attached to a second, opposite wall of the main body.

8. The system of claim 6, further comprising:
   a top body that attaches to the main body,
   wherein the top body covers the storage compartment to enclose the storage compartment.

9. The system of claim 6, further comprising:
   an ancillary body that attaches to the main body,
   wherein the ancillary body includes an ancillary storage compartment.

10. The system of claim 9, wherein the ancillary body pivots and lifts at one end with respect to the main body.

11. The system of claim 10, wherein the ancillary body includes a handle at said one end to facilitate pivoting and lifting of the ancillary body to a single-hand transport configuration.

12. A soft-store and crate system, the soft-store having a storage compartment for holding one or more articles, the system comprising:
   a crate having at least one opening on each of at least two opposing sides; and
   a soft-store including:
      a main body having a plurality of walls that form a portion of the storage compartment;
      an attachment mechanism arranged, when the main body is removably seated in the crate, to pass through the at least one opening in the crate and attach a portion of the main body to the crate, and
      a top body having a fastener arranged to attach to the attachment mechanism to secure the main body to the crate,
   wherein the main body is arranged to be insertable in the crate such that the storage compartment is accessible while the main body is seated in the crate, and
   wherein the main body is arranged such that a substantial portion of the main body is inserted in the crate when the main body is seated in the crate.

13. A modular storage system having a storage compartment for holding one or more articles, the modular storage system comprising:
   a crate having a plurality of openings; and
   a soft-store removably seated in the crate, wherein the soft-store comprises
      a main body that includes the storage compartment, and
      an attachment mechanism having a crate fastener that passes through one of the plurality of openings in the crate to removably attach the main body to the crate, and
      a top body having a fastener that attaches to the attachment mechanism to secure the top body to the main body,
   wherein a substantial portion of the main body is inserted in the crate.

14. The modular storage system of claim 13 wherein the top body covers the storage compartment to enclose the storage compartment.

15. The modular storage system of claim 13, wherein the fastener of the top body attaches to the attachment mechanism to secure the main body to the crate.

16. The modular storage system of claim 13, further comprising:
   an ancillary body that attaches to the main body,
   wherein the ancillary body includes an ancillary storage compartment.

17. The modular storage system of claim 13, further comprising:
   an ancillary body that attaches to the main body,
   wherein the ancillary body pivots and lifts at one end with respect to the main body.

18. The modular storage system of claim 17, wherein the ancillary body includes a handle at said one end to facilitate pivoting and lifting of the ancillary body to a singlehanded transport configuration.

19. The modular storage system of claim 13, wherein the attachment mechanism comprises four fasteners, including two fasteners attached to a first wall of the main body and two fasteners attached to a second, opposite wall of the main body.

* * * * *